United States Patent
Abou-Assaad et al.

(10) Patent No.: US 10,268,174 B2
(45) Date of Patent: Apr. 23, 2019

(54) AUTOMATED REEL CONTROL CONSOLE

(71) Applicant: Hydril USA Distribution LLC, Houston, TX (US)

(72) Inventors: Amine Mounir Abou-Assaad, Houston, TX (US); Hannah Marie Kelly, Houston, TX (US); Karu Anto, Houston, TX (US); Francisco Boquer, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 336 days.

(21) Appl. No.: 15/349,740

(22) Filed: Nov. 11, 2016

(65) Prior Publication Data

US 2017/0139392 A1    May 18, 2017

Related U.S. Application Data

(60) Provisional application No. 62/255,074, filed on Nov. 13, 2015.

(51) Int. Cl.
*G05B 19/05* (2006.01)
*E21B 19/09* (2006.01)
(Continued)

(52) U.S. Cl.
CPC ....... *G05B 19/056* (2013.01); *B65H 75/4484* (2013.01); *B65H 75/4489* (2013.01);
(Continued)

(58) Field of Classification Search
CPC ................................................. G05B 19/056
See application file for complete search history.

(56) References Cited

U.S. PATENT DOCUMENTS

| 6,216,789 B1 | 4/2001 | Lorsignol et al. |
| 7,900,893 B2 | 3/2011 | Teurlay et al. |
| 8,672,043 B2 | 3/2014 | Korach et al. |

FOREIGN PATENT DOCUMENTS

| KR | 20120138357 | 12/2012 |
| KR | 20120138357 A | 12/2012 |
| WO | 2014133504 | 9/2014 |

OTHER PUBLICATIONS

Anonymous, "ReelDirection—NOV Well Intervention and Stimulation Equipment," National OilWell VARCO Publication, Spring 2014, 8 pages.

(Continued)

*Primary Examiner* — Douglas M Menz
(74) *Attorney, Agent, or Firm* — Hogan Lovells US LLP

(57) ABSTRACT

The present disclosure is to systems and methods for actuating pneumatic controls of reels electronically via a remote console, thus expanding remote control capabilities in a combination of hazardous and undesignated areas for oil and gas technologies. The method includes receiving, at a second control network from a first control network, electrical control signals for controlling pneumatic solenoids of a second control network. The second control network provides pneumatic signals to pneumatic valves, based at least in part on the control of the pneumatic solenoids. A controlling feature of the present disclosure is based at least in part on the pneumatic signals, to control, via the pneumatic valves, spooling movement of one or more reels comprising cables or feed lines, thereby spooling the cable or the feed lines.

22 Claims, 14 Drawing Sheets

(51) Int. Cl.
- *B65H 75/44* (2006.01)
- *E21B 19/22* (2006.01)
- *E21B 17/01* (2006.01)
- *E21B 33/06* (2006.01)
- *E21B 34/16* (2006.01)

(52) U.S. Cl.
CPC .............. *E21B 19/09* (2013.01); *E21B 19/22* (2013.01); *B65H 2701/34* (2013.01); *E21B 17/01* (2013.01); *E21B 33/061* (2013.01); *E21B 34/16* (2013.01); *G05B 2219/1106* (2013.01)

(56) References Cited

OTHER PUBLICATIONS

International Search Report and Written Opinion issued in connection with corresponding PCT Application No. PCT/US2016/061778 dated Mar. 2, 2017.

1400

A method including the functional aspect as recited in the following steps;

1405
Receiving electrical control signals at a second control network from a first control network, the electrical control signals to control pneumatic solenoids of the second control network;

1410
Providing, from the second control network, pneumatic signals to pneumatic valves, the pneumatic signals corresponding to the electrical control signals and based at least in part on the control of the pneumatic solenoids of the second control network;

1415
Controlling, based at least in part on the pneumatic signals via the pneumatic valves, spooling movement of one or more reels comprising cables or feed lines, thereby spooling the cable or the feed lines;

1420
Concluding the method as recited in the above steps.

Fig. 14

AUTOMATED REEL CONTROL CONSOLE

RELATED APPLICATION

This disclosure relates to, cross-references, and claims priority from U.S. Provisional Application No. 62/255,074, filed on Nov. 13, 2015, the disclosure of which is incorporated herein by reference, in its entirety.

BACKGROUND

Typical subsea drilling operations include a variety of components at or near the seabed. Such components include a lower stack, including blowout preventer (BOP) rams, as well as a lower marine riser package (LMRP) typically attached to the lower stack. The LMRP typically includes control pods, sometimes referred to in the industry as blue pods and yellow pods. These pods control the functions of the subsea components and communicate with an operator at the sea surface via a multiplex (MUX) cable or umbilical. The MUX or umbilical provides power and communications ability, among other things, to the control pods.

In addition to the electrical MUX cable, hydraulic lines providing the hydraulic utility to the subsea valves are also routed to the BOP. At a vessel or platform on the sea surface, MUX cables and hydraulic lines typically store on reels, which are configured to wind or unwind the MUX cables and hydraulic lines into the sea so it run to the subsea control pods. Such reels are complex, and include, for example, drive motors, level winds, brakes, and other components that must be controlled and monitored.

In certain systems, the control of a reel is either locally at the reel, or remotely, via a pneumatic console. The valves on the pneumatic console send pneumatic signals to a reel assembly, thus allowing control of the reel drive system and ultimately managing the spooling in/out of the MUX cable, umbilicals, and hydraulic lines. Although the console may allow for remote control of a reel, it is fully pneumatic.

SUMMARY

The technology of the present application provides, among other things, methods and systems to actuate the pneumatic controls of the reels electronically via a remote console, thus expanding remote control capabilities taking the requirements of hazardous areas into consideration.

In one embodiment, the present disclosure is to a system including a first control network optionally located remotely from a second control network. The second control network is configured to receive electrical control signals from the first control network. The electrical control signals are for controlling pneumatic solenoids, in one aspect of this disclosure. The second control network is configured for providing pneumatic signals using at least the pneumatic solenoids. The pneumatic signals correspond to the electrical control signals based at least in part on the controlling of the pneumatic solenoids. The second control network of the system is also configured for providing the pneumatic signals to pneumatic valves of one or more reels. The pneumatic valves are associated with one or more reels comprising cables or feed lines. The pneumatic valves are for controlling the spooling movement of the one or more reels for spooling the cable or the feed lines, based at least in part on the pneumatic signals.

In another embodiment, the present disclosure is to a method that includes providing from a first control network that is optionally located remotely from a second control network. The method includes the second control network for receiving electrical control signals from the first control network. The electrical control signals are for controlling pneumatic solenoids of the second control network. The method further includes providing, from the second control network, pneumatic signals to pneumatic valves. The pneumatic signals correspond to the electrical control signals and are based at least in part on the control of the pneumatic solenoids. The pneumatic signals correspond to the electrical control signals and are based at least in part on the control of the pneumatic solenoids. A controlling feature of the present disclosure is based at least in part on the pneumatic signals, to control, via the pneumatic valves, spooling movement of one or more reels comprising cables or feed lines, thereby spooling the cable or the feed lines.

BRIEF DESCRIPTION OF THE DRAWINGS

Drawings, herein, are provided as part of this disclosure and illustrate aspects of implementing the present system and method, and are supported in the detailed description below.

FIG. 14 is a flowchart demonstrating a method for implementing an automated reel control console in accordance with an aspect of the present disclosure.

DETAILED DESCRIPTION

Figure 1:
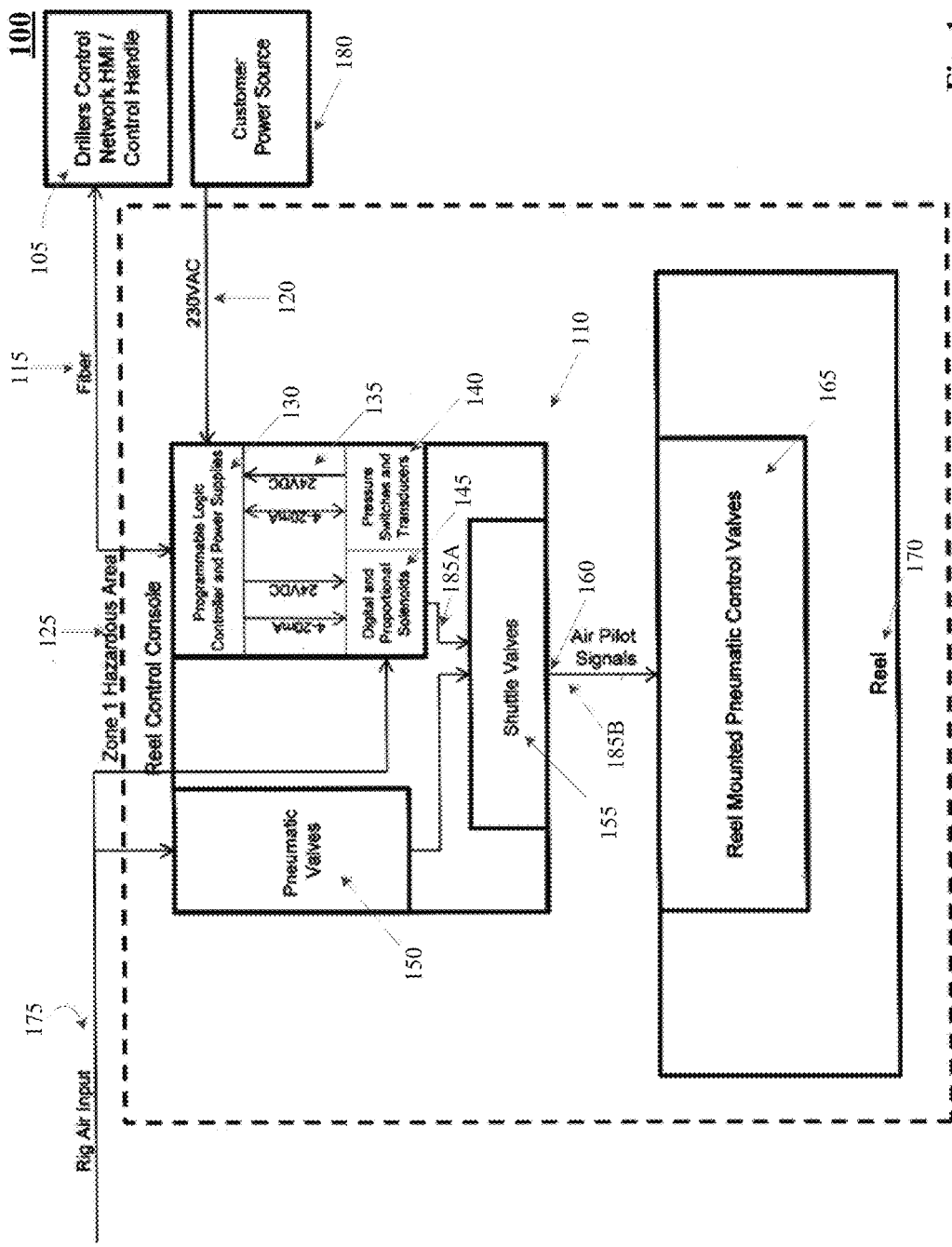
FIG. 1 is a line and block diagram for automated reel control, in accordance with an implementation of the present disclosure.

The technology of the present application provides, among other things, methods and systems to actuate the pneumatic controls of the reels electronically via a remote console, thus expanding remote control capabilities, even in hazardous areas.

In an embodiment, the remote control features disclosed herein is accomplished using electro-pneumatic components to the console in a panel, as well as incorporating pneumatic control valves to electrical control handles. The console is also referred to herein as a control console, a remote control console, a remote console, and a second control network. The electro-pneumatic components and pneumatic control valves are configured to communicate with a programmable logic controller (PLC). The electro-pneumatic solenoids (also referred to herein as solenoid piloted pneumatic valves) are tied into the pneumatic lines running to the reel assembly. The electro-pneumatic solenoid valves are, alternatively, referred to herein as "solenoids." The solenoids are digital and/or proportional solenoids, in one example. The proportional aspect of the solenoid, in an example, allows for proportional control of fluid flow through the valve, in a duty cycle. The digital aspect of the valve, in another example, allows for binary operation of the valve, where the valve is full open or fully closed.

Remote control, in the present examples, is attained via an electrical control handle, human machine interface (HMI)—either character or graphical, or similar means located in the drillers control network (DCN), also referred to herein as a first control network. When controlled from either the DCN or at the console, both being a form of electrical actuation, electrical signals provide input to the PLC of the second control network, which in turn outputs PLC control signals to the solenoids. In an example, the first control network includes an additional PLC for sending the electrical control signals to the PLC of the second control network. The solenoids of the second control network transition the electrical signals to pneumatic signals (also referred to herein as pneumatic pilot signals) that are sent to the reel assembly for reel control in spooling. In implementations, the use of pressure transmitters as well as pressure switches accommodates a feedback process, with feedback signals, for the pneumatic lines (also referred to herein as air lines or air pilot lines). The feedback is provided to both the DCN and the reel control console, and is based on monitoring of at least the pneumatic lines. In another example, the feedback and monitoring forms the basis for allowing intervention at the DCN, the reel control console, or at the reel for reel control in spooling.

In another aspect, the monitoring is as to the pneumatic signals in the pneumatic lines. Although the above description is to controlling a single reel from a reel control console or the DCN, the above description extends to accommodate as many reels as a system requires. For example, in some embodiments, the reel control console, as described above, includes sets of controls for up to 5 reels or more, consisting of, for example, a blue MUX cable reel, a yellow MUX cable reel, a spare MUX cable reel, a hot line hose reel, and a gas handler hose reel.

The present technology, additionally, resolves issues relating to electronic remote control of (a) a reel, (b) local control at the reel assembly, as well as (c) remote control at the reel control console (located in a moon pool). The moon pool is generally a reference to a chamber that houses remote control network equipment and that is typically in communication with the local control at the reel assembly and the DCN. In an implementation, the DCN (first control network) is at least one or more computing systems networked together to perform the functions disclosed herein. The present technology also enables remote maintenance of the pneumatic signals and the pneumatic lines between the reel assemblies and the reel control console, which forms the second control network. As in the case of the first control network, the second control network includes at least one or more computing systems networked together to perform the functions assigned to the console. According to embodiments of the present technology, electrical methods are applicable to obtain remote control from the DCN to the reel control console and to obtain positive feedback to the DCN.

In certain aspects, a PLC is applicable to interface between the reel assembly and the DCN. The PLC is hosted in the second control network and provides the inputs and outputs, also referred to herein as PLC control signals, to the electro-pneumatic instruments. The electro-pneumatic instruments, in an example, is tied into the pneumatic tubing of the reel control console for managing the pilot air being used to control the reel assembly, as well as for providing feedback. In an implementation, fully pneumatic (e.g., using pneumatic valves and/or shuttle valves) or a fully electrical system (e.g., using control switches or handles) is mounted to the reel control console and is used to control the reel remotely from the reel assembly. In addition, in some example embodiments, there are about 5 functions available for each reel via the fully pneumatic or full electric system. For example, Reel In, Reel Out, Speed Control, Auto Tension Control (Enable/Disable), and Manual Override Active (e.g., for feedback purposes) are functions available to control the reel.

In some embodiments, the instruments on the reel control console provide control for all reel functions, but the instruments also provide appropriate feedback for each function, in addition to that for Manual Override Active status. Accordingly, the reel control console (second control network) provides intervention over the electrical control signals received from the DCN (first control network). In a further aspect, for control of functions to the reel, such as, Reel In, Reel Out, and Auto Tension Control Enable/Disable, an on/off signal is included (e.g., for providing digital output). In yet another aspect, for a function of Speed Control for the reel, a proportional signal is provided for the reel (e.g., as an analog output to the reel). For feedback, digital inputs can be used for each function. In an example of the present implementation, digital inputs are not used in certain reel functions, and preference is instead provided to analog inputs—e.g., for Speed Control. In an implementation for the digital functions, discrete solenoids are used in the control processes, while pressure switches are used in the feedback processes. In an implementation for the analog functions, proportional solenoids are used for control, and the pressure transmitters are used for feedback.

According to certain embodiments, all of the instruments and power supplies for the second control network are located in flameproof enclosures rated for hazardous areas. The first control network, however, is designated as outside the hazardous areas. Additionally, in an implementation, the PLC is located in one of the flameproof enclosures on the reel control console. Alternatively, in an implementation, the PLC is located in another safe area within the hazardous area. The emergency stop, push buttons, control handles, and LEDs are located on the reel control console, in aspects of the present disclosure. In reel control console designs that include electrical control handles mounted on the panel rather than pneumatic valves, the electrical control handles, in one example, are rated for use in a hazardous area. Furthermore, in some aspects, because these enclosures are mounted on the reel control console, which is located in a hazardous area, all of the electrical assemblies are certified for hazardous area usage.

One advantage of the present technology is that it provides a reel control system with control of the reels from the Drillers Control Network (DCN) with positive feedback. This requirement is achieved electrically, and is an additional capability to the local control at the reel assembly, while remote control capability from a pneumatic stand-alone reel control console is also included. Accordingly, the present disclosure advantageously expands capability for remotely controlling reels from multiple locations, and increases the flexibility of having a wide range of customizable operational mode possibilities with the use of the PLC and electrical control handles.

Example

The following is an example of the system and method described above and is supported by FIGS. 1 and 2-14. FIG. 1 is a line and block diagram 100 for automated reel control, in accordance with an implementation of the present disclosure. In this example, the present system 100 includes a second control network 110 for receiving signals from a first control network 105, which is optionally located remotely from the second control network 110. The first control network 105 may be a DCN, in communication with a reel control console forming the second control network 110. In this example, the first control network 105 provides electrical control signals via a communication channel 115 to the second control network. Communication channel 115 may be cable fiber for communicating the electrical control signals via optical signals, but a person of ordinary skill would understand that the signals substantially communicated are electrical control signals from the first and second control networks. A person of ordinary skill would also understand that alternate types of communication media area applicable to transfer the electrical control signals. Cable fiber 115 is a communication medium between the first and second control networks 105-110 and other communication media are applicable between networks 105-110, in one aspect of this disclosure. The electrical control signals, on cable fiber 115, are for controlling digital and/or proportional solenoids 145 in the second control network 110.

In the present example, the second control network 110, using at least the pneumatic solenoids 145, is configured for providing pneumatic signals via pneumatic lines 185A and 185B, together forming pneumatic line 160 with any intervening valves 155. Intervening valves 155 provide sufficient air from rig air input 175 to enable a smaller air volume and/or pressure, from the pneumatic solenoids 145 via pneumatic line 185A, to trigger the air pilot signals on pneumatic line 185B. The pneumatic solenoids 145 may be digital and/or proportional solenoids, in accordance with an aspect of the present disclosure. The intervening regulating valves can include shuttle valves 155 or any other valves for performing similar functions. The pneumatic signals correspond to the electrical control signals in cable fiber 115. The pneumatic signals are based at least in part on the controlling of the digital and/or proportional solenoids 145.

The second control network 110 is also configured for providing the pneumatic signals to first pneumatic valves 165 of one or more reels 170. The first pneumatic valves 165 are also referred to herein as the mounted pneumatic control valves for the reel assembly. The one or more reels 170 include cables or feed lines, and the pneumatic signals control spooling movement of the one or more reels 170 for spooling the cable or the feed lines. In an example, the spooling movement may be rotational or axial, about an axis of the reel that allows at least spooling in/out of the cables or feed lines. Further, in this example, the second control network 110 is configured for providing (a) monitoring of the pneumatic lines 160 that communicate the pneumatic signals between the second control network 110 and the first pneumatic valves 165, and optionally, (b) feedback to the first control network 105 in accordance with the monitoring. The one or more reels 170 are configured for the spooling movement responsive to or based on, at least in part, the pneumatic signals and/or the feedback.

In an implementation, the intervening pneumatic valves are also referred to herein as second pneumatic valves that may be configured as shuttle valves 155 to receive and maintain air received from a rig air input 175. The shuttle valves are configured to receive and maintain air pressure in pneumatic lines, such that a fractional quantity or pressure of air from the pneumatic solenoids 145, representing the pneumatic signals on pneumatic line 185A, triggers the pneumatic signals to present to the first pneumatic valves 165 on reels 170. In a further implementation, the second control network 110 includes third pneumatic valves 150, which receive and maintain supply air from a rig via rig air input 175. The third pneumatic valves feed the supply air to second pneumatic valves 155 that passes the pneumatic signals to the first pneumatic valves 165. In an aspect, the pneumatic signals in pneumatic lines 185A and 185B, collectively referred to as pneumatic lines 160, are the same or similar A similar pneumatic signal may correspond to a volume or pressure variation of the pneumatic signal on pneumatic line 185A, but that maintains the pneumatic signal as provided from the pneumatic solenoids 145. For all intents and purposes, pneumatic signals in lines 185A and B are considered the pneumatic signals for controlling the reels 170.

In another example of a system and method that is described generally above and that is supported by FIGS. 2-14, FIG. 2 is a line and block diagram 200 for an alternate automated reel control. In this alternate implementation, system 200 includes a second control network 210 for receiving signals from a first control network 205 that is optionally located remotely from the second control network 210. In this example, the first control network 205 provides electrical control signals via cable fiber 215, or other communication channel means, to the second control network 210. A PLC may be used to provide the electrical control signals to the second control network as explained with respect to FIG. 3, below. The electrical control signals, on cable fiber 215, are for controlling pneumatic solenoids 245 in the second control network 210. As with the example of FIG. 1, the pneumatic solenoids 245 may be digital and/or proportional solenoids. The second control network 210, using at least the pneumatic solenoids 245, is configured for providing pneumatic signals, via pneumatic lines 285A-B, together forming pneumatic line 260. The electric control handles 250, in this alternate implementation, replace the pneumatic and shuttle valves 150-155 of FIG. 1. In this alternate implementation, the electric control handles 250 provide intervention capabilities to the programmable logic controller (PLC) and power supplies 230, instead of using the pneumatic and shuttle valves 150-155, as in FIG. 1. The pneumatic signals of pneumatic lines 260 correspond to the electrical control signals in cable fiber 115. The pneumatic signals in pneumatic line 260 are based at least in part on the controlling of the pneumatic solenoids 245.

The second control network 210 is also configured for providing the pneumatic signals to first pneumatic valves 265 of one or more reels 270. The one or more reels 270 include cables or feed lines and the pneumatic signals control spooling movement of the one or more reels 270 for spooling the cable or the feed lines. Further, in this alternate implementation, the second control network 210 is configured for providing (a) monitoring of the pneumatic lines 260 that communicate the pneumatic signals between the second control network 210 and the first pneumatic valves 265, and (b) feedback to the first control network 205 in accordance with the monitoring. The one or more reels 270 are configured for the spooling movement responsive to or based on, at least in part, the pneumatic signals and/or the feedback. A person of ordinary skill would recognize that, based on the present disclosure, aspects of the implementations from FIGS. 1 and 2 may be combined to provide alternate implementations than expressly presented in these implementations. Such alternate implementations are not limited by the present disclosure.

Figure 3:
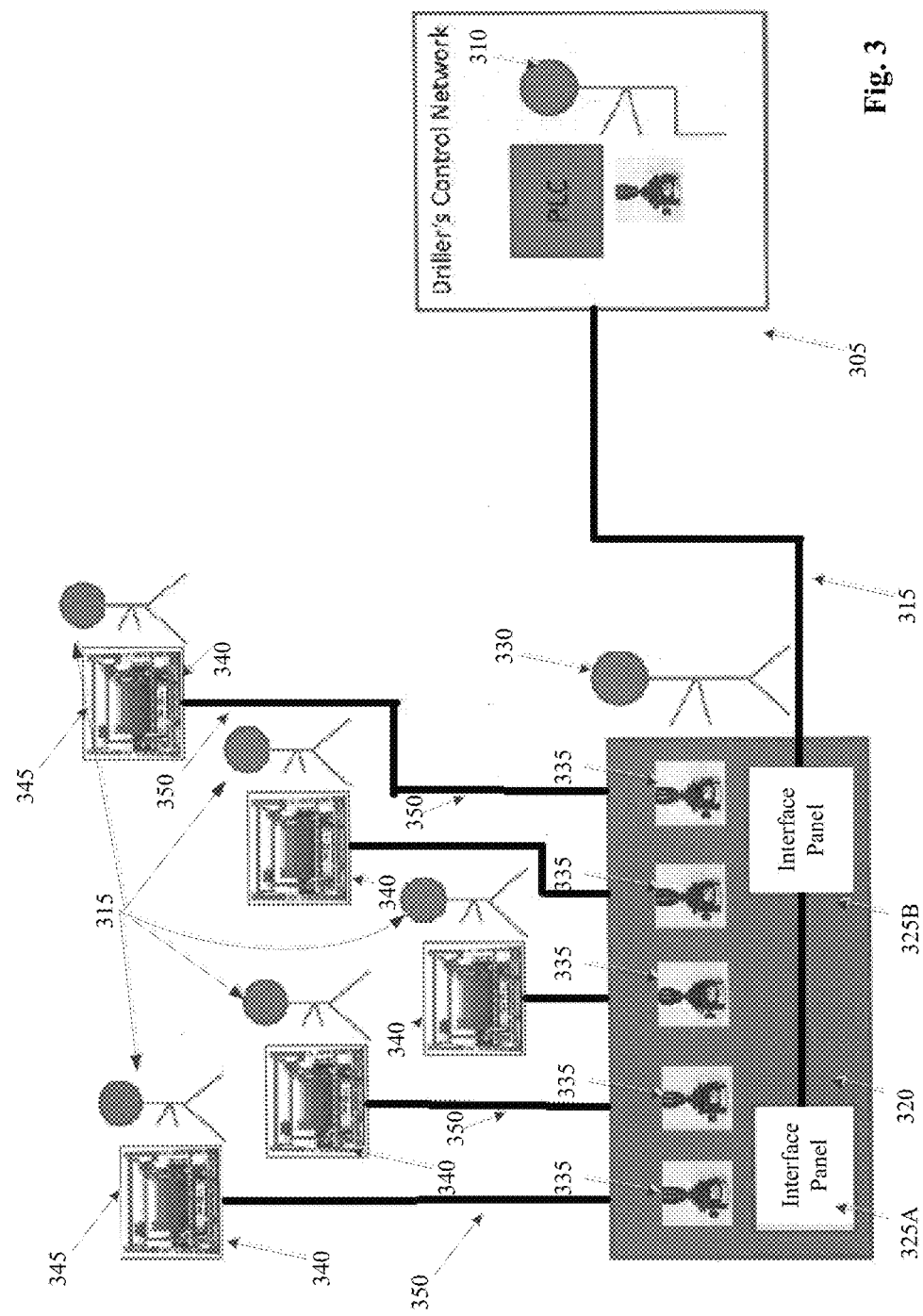
FIG. 3 is a line and block diagram illustrating the intervention capabilities in an implementation of the automated reel control according to an aspect of the present disclosure.

In further implementations of system 100 or alternate system 200, the first control networks 105/205 are at least a network of one or more computing devices with a human machine interface (HMI) for the providing of the electrical control signals to the second control networks 110/210. FIG. 3 is a line and block diagram 300 illustrating the intervention capabilities using the HMI in each implementation 100/200, in the automated reel control implementations according to the present disclosure. The DCN 310 (first control network 105/205) includes at least an HMI for intervention with respect to the electrical control signals provided via communications line 315. The reel control console 320 (second control network 110/210) includes interface panels 325 and multiple electric control handles 335 for intervention at the reel control console 320. As illustrated in FIG. 3, manual intervention is possible via the HMI for both, the DCN 310 and the reel control console 320. Furthermore, at the reels 340, which receive the pneumatic signals via pneumatic lines 350, further intervention is possible by corresponding pneumatic controllers 340. The intervention may be manual via users 315. Accordingly, as in the case of the first control networks 105/205, in another implementation of system 100 or alternate system 200, the second control network 110/210 is also at least a network of one or more computing devices with a human user interface (HMI) for controlling the providing of the pneumatic signals to the first pneumatic valves. The intervention at the reel control console 320 is to all aspects of the control that is possible at the DCN. Accordingly, the intervention at the reel control console 320 adapts the pneumatic signals differently from the electrical control signals.

In further implementations of system 100 or alternate system 200, the second control network 110/210 includes at least electric switches or handles 335. This is illustrated in FIG. 3, as described above. The electric switches or handles 335 are coupled at least a programmable logic controller (PLC) 130/230 for providing PLC control signals for the digital and/or proportional solenoids 145/245. The PLC control signals corresponds to the electrical control signals received from first control network 105/205. The PLC control signals are for (a) the controlling of the digital and/or proportional solenoids 145/245, and (b) the providing of the pneumatic signals via pneumatic line 160/260 by regulating supply air received from a rig via rig air input 175/275.

In yet another implementation of the system 100 or the alternate system 200, the second control network 110/210 includes at least a programmable logic controller (PLC) 130/230 for providing PLC control signals for digital and/or proportional solenoids. The PLC control signals correspond to the electrical control signals received from first control network 105/205 and are configured for the controlling of the digital and/or proportional solenoids 145/245. In an example, PLC control signals for the pneumatic solenoids is provided via control signal lines 135/235, illustrated as by limiting amperage and voltage requirements—as 4-20 mA current and 24V DC voltage lines. In an implementation, the power supply for the PLC 130/230 for the second control network 110/210 comes from a 230V AC power source 180/280, via power supply line 120/220. The 230V AC power source 180/280 is illustrated as an external power source. In an alternate embodiment, the power source may be internal to the system, but outside the hazardous area 125/225.

In yet another implementation of the system 100 or the alternate system 200, the second control network 110/210 includes at least pressure switches and transducers 140/240, each for monitoring the pneumatic lines 160/260 between one or more of: the second control network 110/210 and the first pneumatic valves 165/265. In another example, the second control network 110/210 includes the at least pressure switches and transducers 140/240 for providing the feedback to the first control network 105/204, as described above generally with respect to FIGS. 1 and 2. The feedback, in one example, is provided via the PLC control signal lines 135/235 marked for 4-20 mA and 24V DC V control signals. The feedback may be positive feedback corresponding to monitored pressure from within the pneumatic lines 160/260.

In an aspect of system 100 or alternate system 200, the cables or the feed lines on the one or more reels 170/270 are one or more of multiplex (MUX) Cable, a fluid hose, an electrical cable, or a gas hose. In another example, the first control network 105/205 is designated as outside a pre-determined hazardous area 125/225, while the second control network 110/210, the first pneumatic valves 165/265, and the one or more reels 170/270 are designated as within the pre-determined hazardous area 125/225.

In a further example, the electrical control signals or the pneumatic signals include one or more of a reel-in signal, reel-out signal, a speed control signal, an auto tension control signal, an on/off control signal, and a manual override signal. The first control network communicates at least the speed control signal as a proportional analog signal to the second control network, in an aspect; while the second control network communicates at least a digital feedback signal, as part of the feedback, to the second control network. The digital feedback signal corresponds to monitored pressure in one or more of: (a) first pneumatic lines 185A/285A in the second control network 110/210, (b) second pneumatic lines 185B/285B to the first pneumatic valves 165/265, (c) the first pneumatic values 165/265, and (d) the pneumatic solenoids 145/245.

In another example, the second control network 110/210 allows intervention to adapt the pneumatic signals differently from the electrical control signals based at least in part on monitored pressure in one or more of: (a) the first pneumatic lines 185A/285A in the second control network 110/210, (b) the second pneumatic lines 185B/285B to the first pneumatic valves 165/265, (c) the first pneumatic values 165/265, and (d) the pneumatic solenoids 145/245. The control of the axial movement of the one or more reels is by one or more of a pneumatic motor, in an aspect of the present disclosure. For example, the first pneumatic valves at the reel assembly trigger the pneumatic motor to spool the reel, based on the pneumatic signals provided to the first pneumatic valves.

Figure 4:
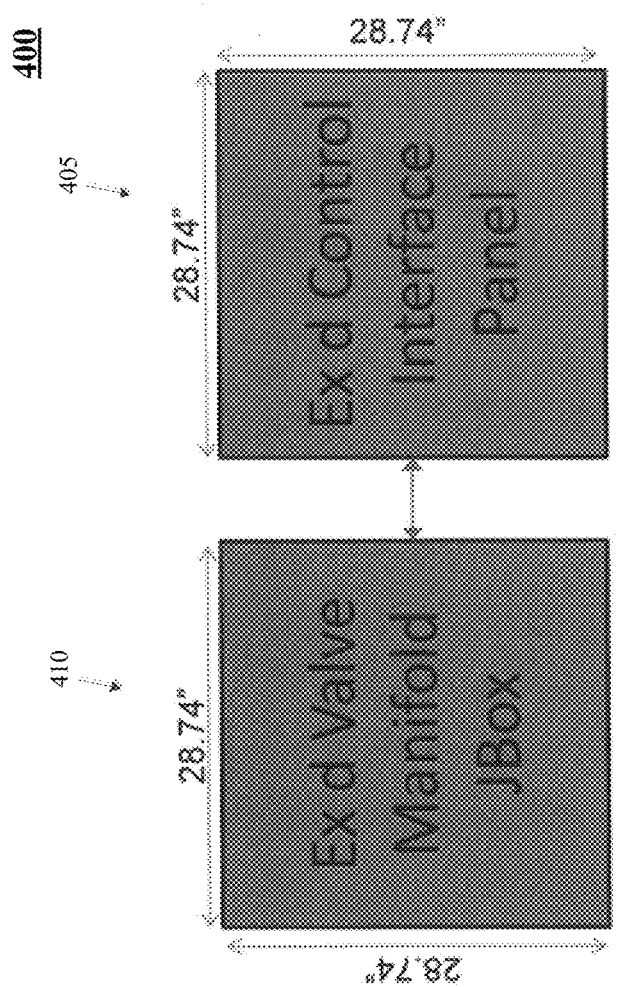
FIGS. 4 and 5 illustrate the physical features of components of the automated reel control implementations according to an aspect of the present disclosure.
Figure 5:
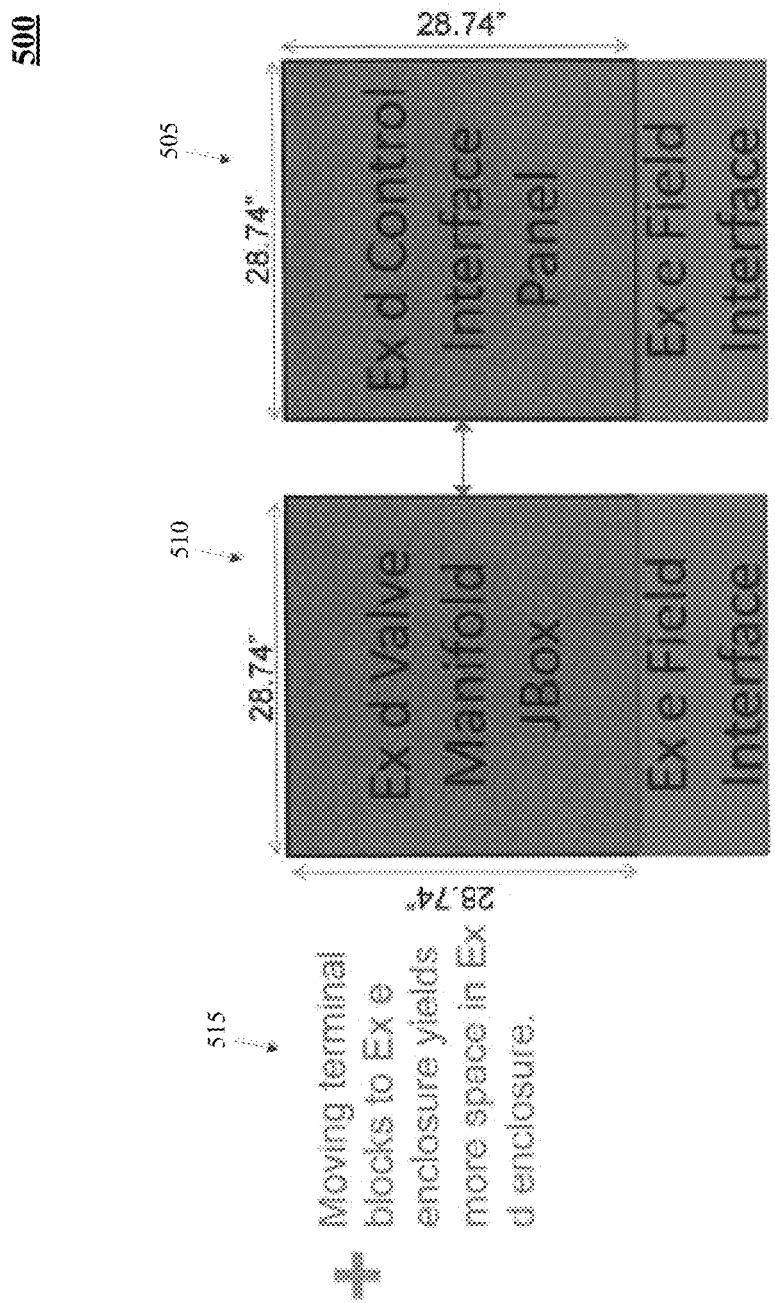

In yet another example, or more of the pneumatic solenoids 145/245; the pressure switches and pressure transmitters 140/240; and the power supplies, the PLC, and the PLC components 130/230 are preferably located in a flameproof enclosure within the pre-determined hazardous area. Further components of the second control network 110/210, including on/off valves, on/off solenoids, emergency stop, and light emitting diode indicators, for functioning with the second control network 110/210 are preferably located in an increased safety enclosure within the pre-determined hazardous area. Blocks 400-500 in FIGS. 4 and 5 illustrate dimensional characteristics of a flameproof (Ex d industry standard) enclosure, as well as an increased safety enclosure and interface (Ex e industry standard). The manifold boxes 410/510 or interface panels 405/505 may encompass one or more of the components described above, in the physical implementation of the present disclosure. Moreover, FIG. 5 also provides that terminal blocks 515 may be enclosed in Ex e industry standard enclosures to provide room for components within the Ex d industry standard enclosures.

Figure 6:
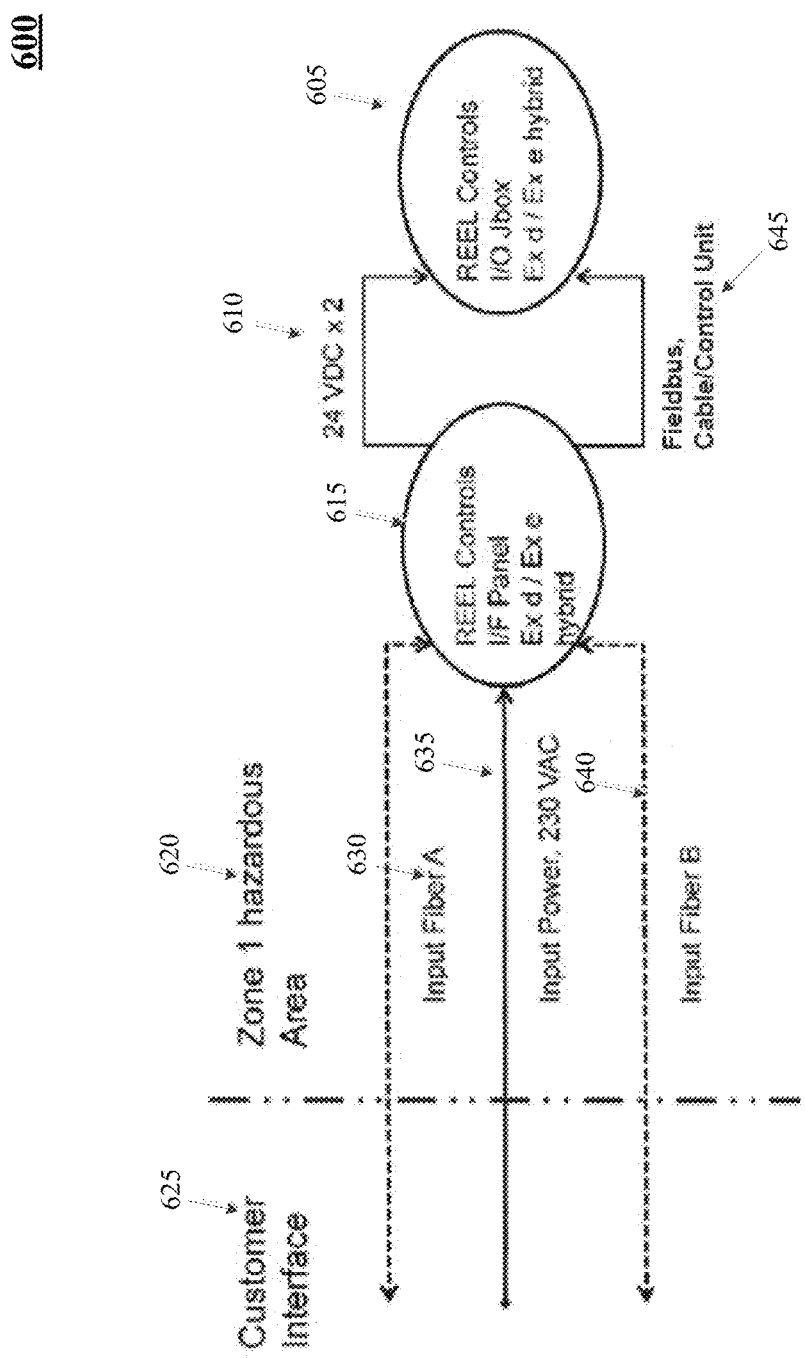
FIGS. 6 and 7 illustrate power and communication connectivity schemes in components of the automated reel control implementations according to an aspect of the present disclosure.
Figure 7:
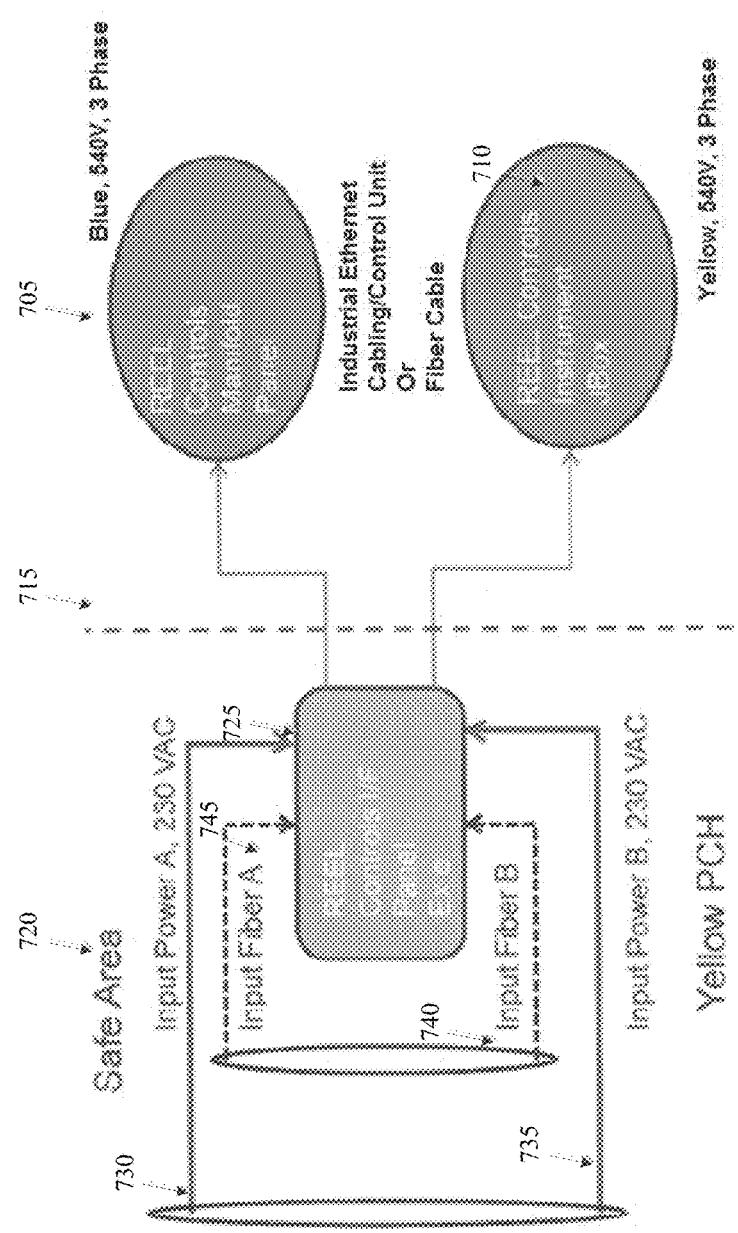

FIGS. 6 and 7 illustrate power and communication connectivity schemes 600-700 in components of the automated reel control implementations according to aspects of the present disclosure. In the power and communication connectivity scheme 600 of FIG. 6, the zone 1 hazardous area 620 is separated from the customer interface 625, and all communications between the zone 1 hazardous area 620 and the customer interface 625 are made via communication and power lines 630-640. Cable fiber lines 630, 640 represent the communication lines, but other methods of wired and wireless communicating between the zone 1 hazardous area 620 and the customer interface 625 are also applicable. Power line 635 provides 230V AC supply from the customer interface 625 to the hazardous area 620. The second control network, illustrated as reels controls 615, receives the power line for its PLC and other components power. A field bus (e.g., using process field bus) communication channel is applicable to provide communication 645 between networks or components 605, 615 in the hazardous area 620, in one aspect of the present disclosure. The communication channel 645 may include a communication control unit, functioning with the field bus requirements, in another aspect. The received 230V AC can be bifurcated to a 24V DC supply 610 for the input/output (I/O) box enclosure 605. FIG. 6 also illustrates that the reel control console components are enclosed in an Ex d or Ex e, or a hybrid enclosure 605, 615, as previously described in this disclosure.

In the power and communication connectivity scheme 700 of FIG. 7, the zone 1 hazardous area 620 (of FIG. 6) includes a safe area 720. The safe area 720 includes the reel control interface panel in an Ex e enclosure 725. Communication to the reel control interface panel in an Ex e enclosure 725 is by way of cable fiber 740-745, in one aspect. Power is provided via one or more input AC lines, illustrated as input power A and B, at 230V AC rating 730-735. The remainder of the reel control area 715 is in an undesignated area in the zone 1 hazardous area 620 (of FIG. 6). This undesignated area includes the reel control manifold panel 705 and the instrument junction box 710. Industrial ethernet cabling may be used for communication in this area. An industrial ethernet control unit is also available to control the communication between the designated safe zone and the undesignated areas. The reel control manifold panel 705 and the instrument junction box 710 are powered via 540V AC 3 phase supplies, as illustrated in FIG. 7.

Figure 8:
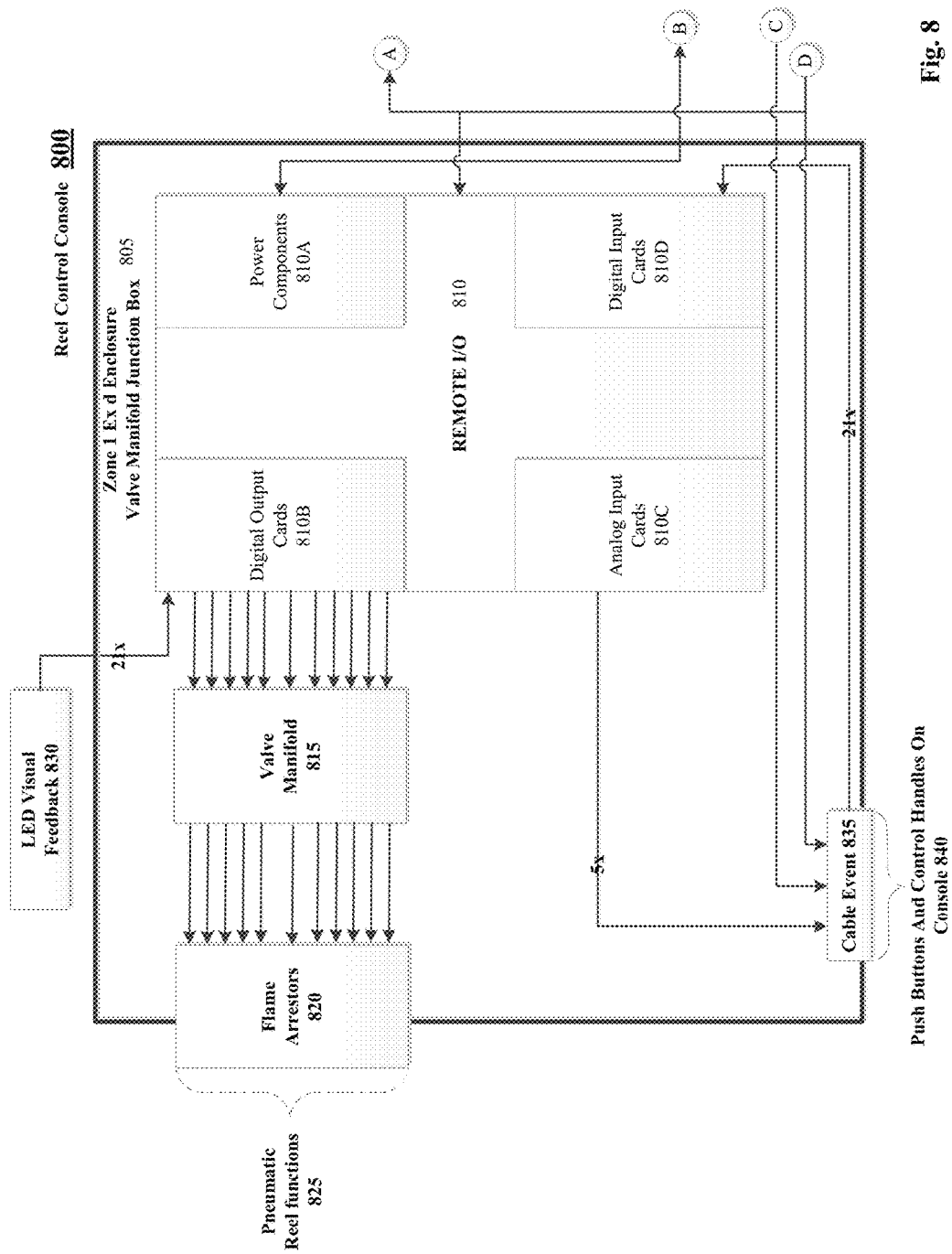
FIGS. 8 and 9 illustrate line and block diagrams of parts of a reel control console for the automated reel control implementations according to an aspect of the present disclosure.
Figure 9:
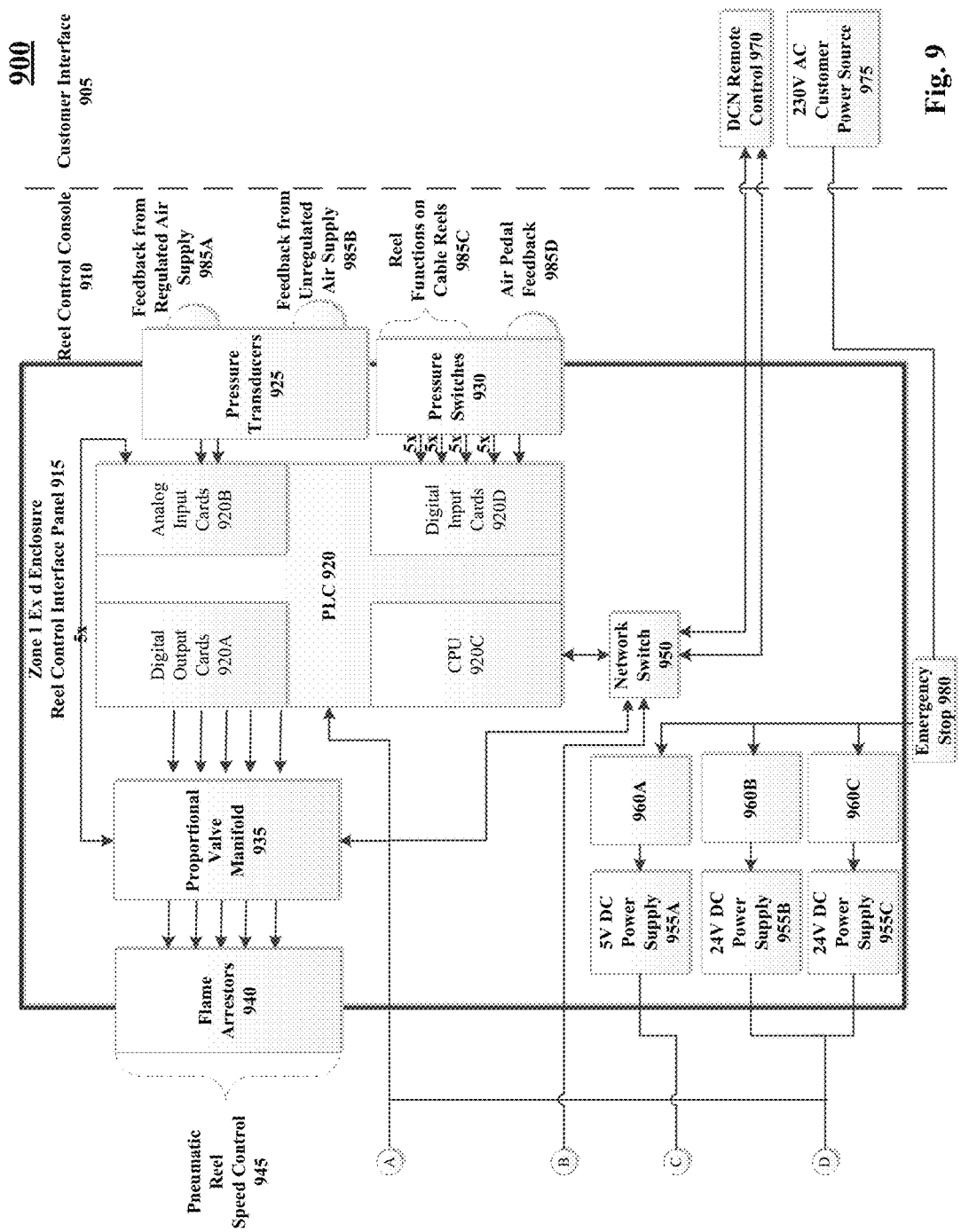

FIGS. 8 and 9 illustrate line and block diagrams of parts of a reel control console for aspects of the automated reel control implementations of the present disclosure. The reel control console 800/910, in one aspect, includes a Zone 1 Ex d flameproof enclosure for the valve manifold junction box 805, as disclosed above. The valve manifold junction box 805 includes the remote input-output (I/O) components 810. These components 810 include the power components 810A, digital output cards 810B, analog input cards 810C, and digital input cards 810D, in an implementation. The valve manifold junction box 805 is connected via one or more communication lines to valve manifold 815. Valve manifold 815 is, in turn, connected via flame arrestors 820, to provide the pneumatic reel functions 825 for the reel controls.

The automated reel control 800, also includes cable events component 835 comprising or connected to push buttons and control handles 840 on the console. There are light emitting diodes (LEDs) for visual feedback 830 from the automated reel control 800. The communication lines between the digital output cards to the visual feedback 830 may be a 21-bit line, while the communication line for the analog input cards 810C to the cable event component 835 may be 5-bit channels, in an implementation. Furthermore, lines from the valve manifold junction box 805 and the cable event component 835 connect to other components in the reel control console 910, of FIG. 9. For example, the line (A) and (D) connect power supplies from 24V DC supply 955B-C to the PLC 920, as well as cable event component 835. The push buttons and control handles 840 on the console 800/910, therefore, act via the cable event component 835 to control the power supply.

The automated reel control console 800/910, also includes additional components in another Zone 1 Ed d flameproof enclosure—for the reel control interface panel 915. The reel control interface panel 915 includes PLC 920, which further includes the digital output cards 920A, the analog input cards 920B, the central processing unit (CPU) 920C, and the digital input cards 920D, in one example. The reel control interface panel 915 also includes the pressure transducers 925 and the pressure switches 930 for providing monitoring and feedback to the automated reel control console 800/910, for communicating to the first control network, as discussed with respect to FIGS. 1 and 2.

In the line and block diagram 900 of FIG. 9, the reel control interface panel 915 further includes network switch 950 for routing the communication signals on various channels between the various components. For example, the network switch 950 switches signals between the first control network (illustrated as DCN remote control 970) and the second control network (reel control console 910). The switched signals are directed to the proportional valve manifold 935 for the pneumatic reel speed control 945, via the flame arrestors 940, of the reel control console 910. The reel control console 910 includes transformers or high voltage dividers 955-960 to provide component voltages on lines (C) and (D) from 230V AC customer power source 975. The 5V DC power supply is provided to the systems via line (C), while 24V DC supply is provide via lines (A) and (D). In a further example, circuit breakers 960A-C are provided between the high voltage dividers/transformers 955 and the external power source 975.

The reel control interface panel 915 further includes feedback based on the monitoring in the pressure transducers 925 and the pressure switches 930. Pertinently, the feedback from regulated air supply is illustrated by feedback loop 985A and is sensed in the pressure transducer 925, along with feedback from unregulated air supply, illustrated in loop 985B. Reel functions on the cable reels, illustrated under a function 985C, are sensed or monitored via pressure switches 930, along with air pedal feedback, illustrated via loop 985D. Further, the customer interface 905 is illustrated as outside the hazardous area hosting the reel control interface 910, as discussed with respect to FIGS. 1 and 2. FIG. 9 also illustrates an emergency stop button, switch, or handle 980 for isolating the power source, thereby stopping all actions from the reel control console 910.

Figure 10:
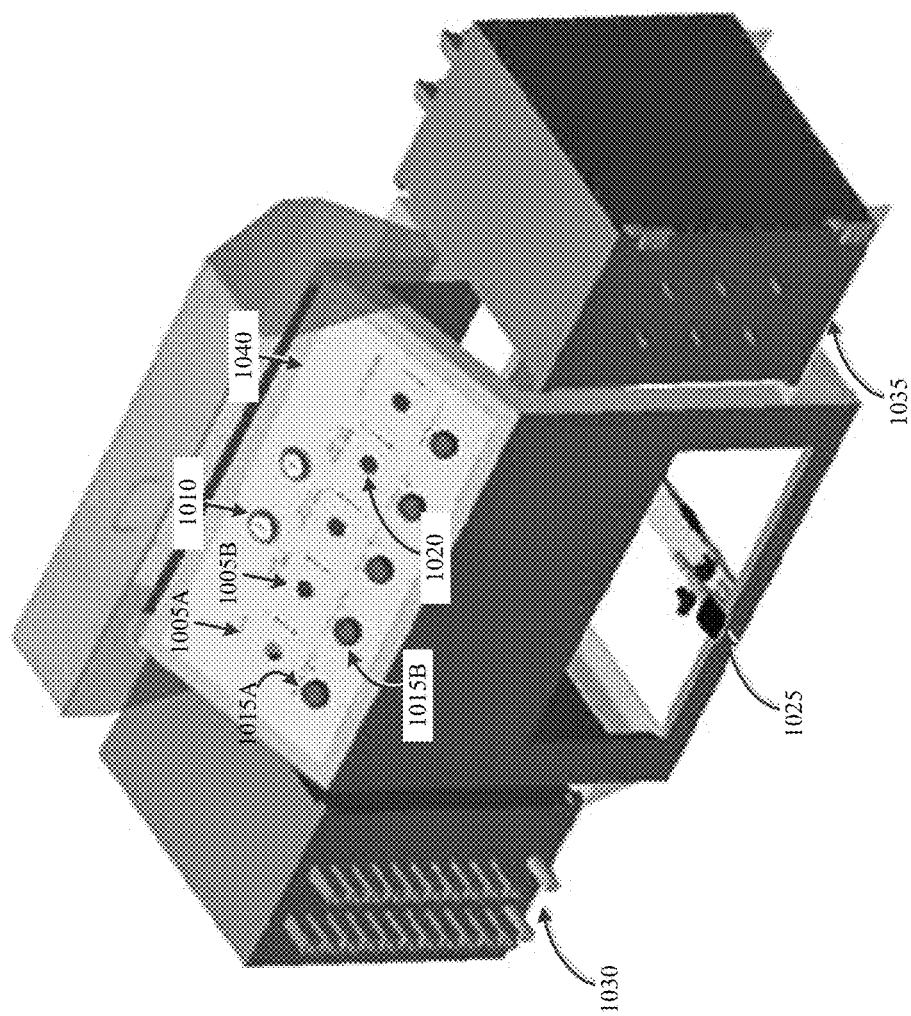
FIG. 10 illustrates a reel control interface panel for a reel control console, in accordance with an aspect of the present disclosure.

FIG. 10 illustrates a reel control interface panel 1040 for a reel control console 1000, in accordance with an aspect of the present disclosure. The reel control interface panel 1040 includes push buttons 1015 and indicators 1005-1010. The reel control console 1000 includes air pedal 1025 and physical input/output console component 1030 and power console component 1035.

Figure 11:
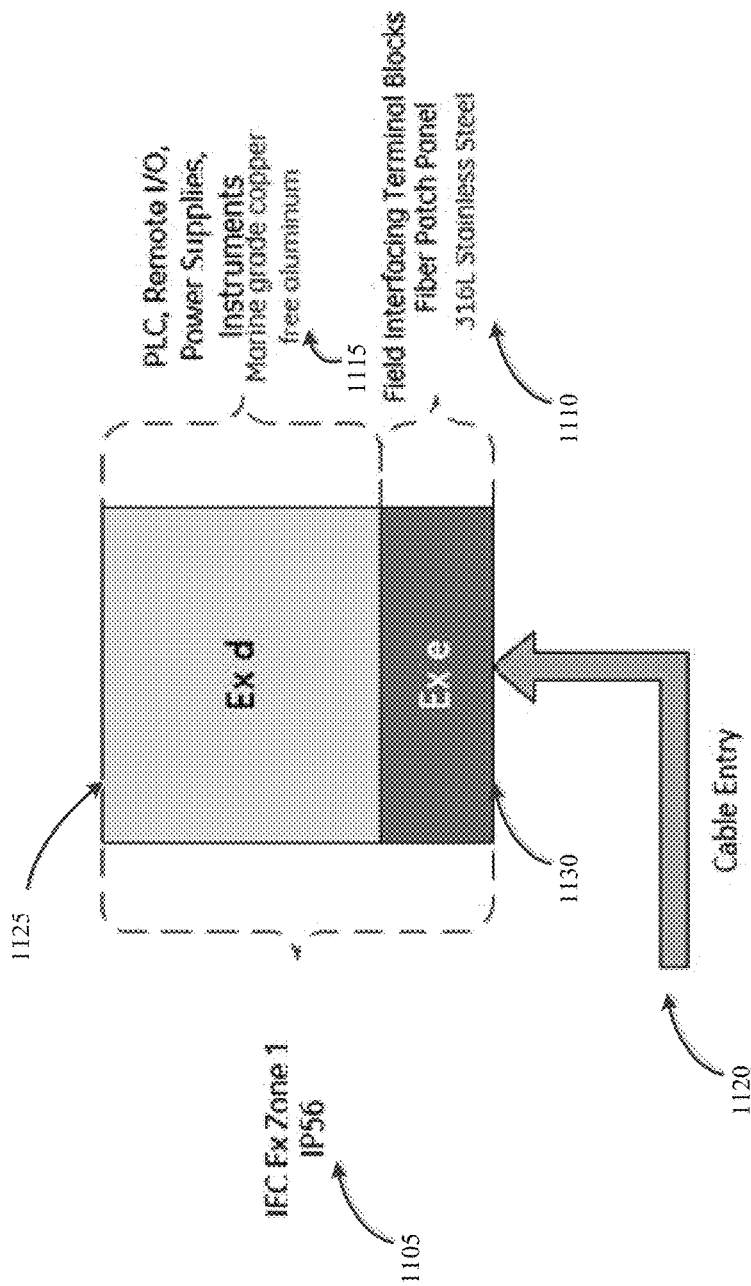
FIG. 11 illustrates an interface between components that provide increased safety and flameproof enclosures for the automated reel control implementations in accordance with an aspect of the present disclosure.

FIG. 11 illustrates an interface between components 1100 that provide increased safety Ex e 1130 and flameproof enclosures Ex d 1125 for the automated reel control implementations of the present disclosure. Pertinently, the increased safety (Ex e) and flameproof enclosures (Ex d) are designed to qualify under the International Electrotechnical Commission (IEC) standard system requirements (e.g., under IEC standards 60079-7 and 60079-1) for Zone 1 areas, with an IP56 degree of protection to the components within the zone, as illustrated by numeric identifier 1105. In an example, the increased safety Ex e enclosure 1130 is for field interfacing terminal blocks and fiber path panels 1110, and is built from 316L degree stainless steel. In another example, the flameproof enclosures Ex d 1125 are for the PLC, remote I/O, power supplies, and other instruments 1115, and is built from marine grade copper-free aluminum.

Figure 12:
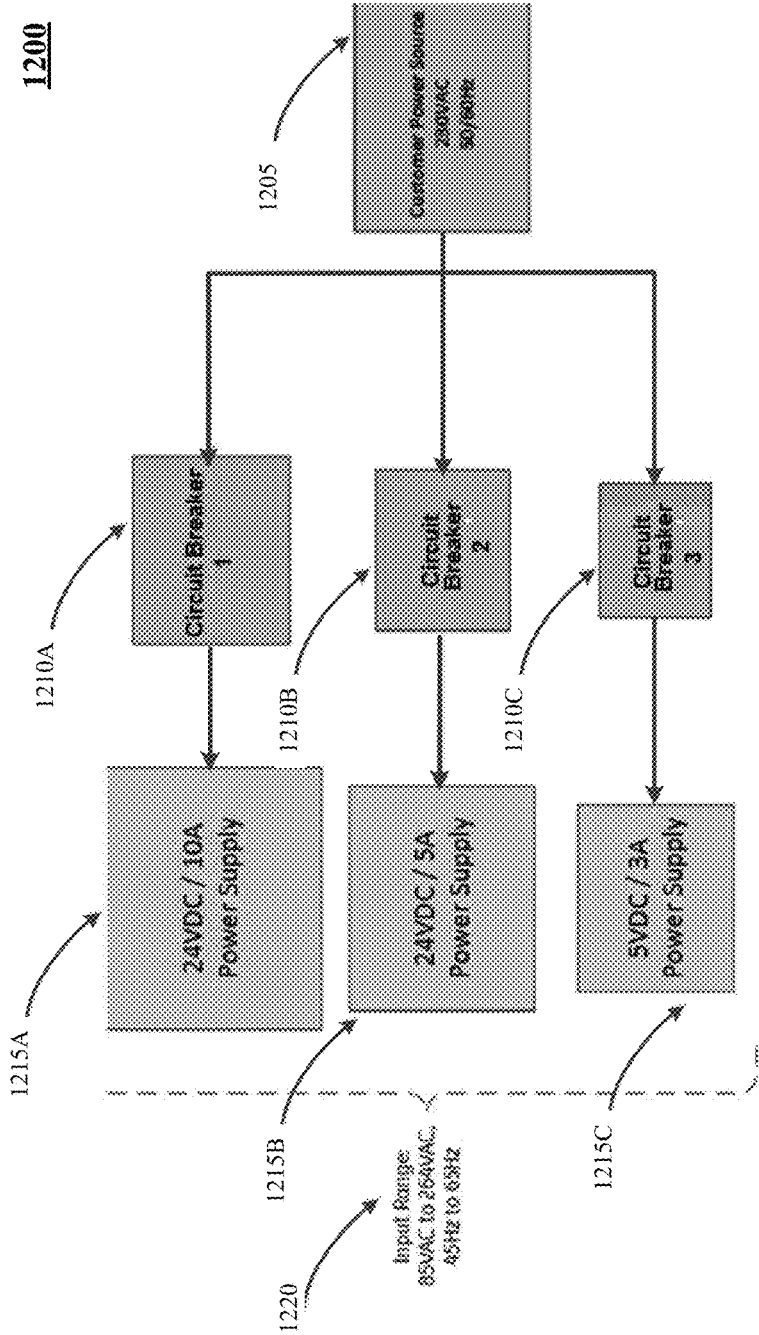
FIG. 12 illustrates the power connectivity schemes in components of the automated reel control implementations according to an aspect of the present disclosure.

FIG. 12 illustrates the power connectivity schemes 1200 in components of the automated reel control implementations according to aspects of the present disclosure. The power connectivity schemes 1200 is a blow-up of the internal voltage supply 955, the circuit breakers 960, and customer power source 975 of FIG. 9. As explained, with respect to FIG. 9, the reel control console 910 includes transformers or high voltage dividers 955-960, illustrated in FIG. 12 as supply components 1215A-C. These components provide direct current (DC) component voltages for the reel control console components by transforming received voltages of about 85V to 264V of alternating current (AC), with frequencies between 45 to 65 Hz, from the customer power source 1205 which is external to the reel control console. Circuit breakers 1210A-C provide overdraw or shorting protection to the electrical circuits between the internal supply 1215A-C and the external source 1205. The circuit breakers 1210A-C are sized according to the power calculations for each of internal power supply lines 1215A-C, in one example. The tripping mechanism in the circuit breakers may be by delayed thermal tripping for overload protection and/or electromechanic tripping for short circuit protection.

Figure 13:
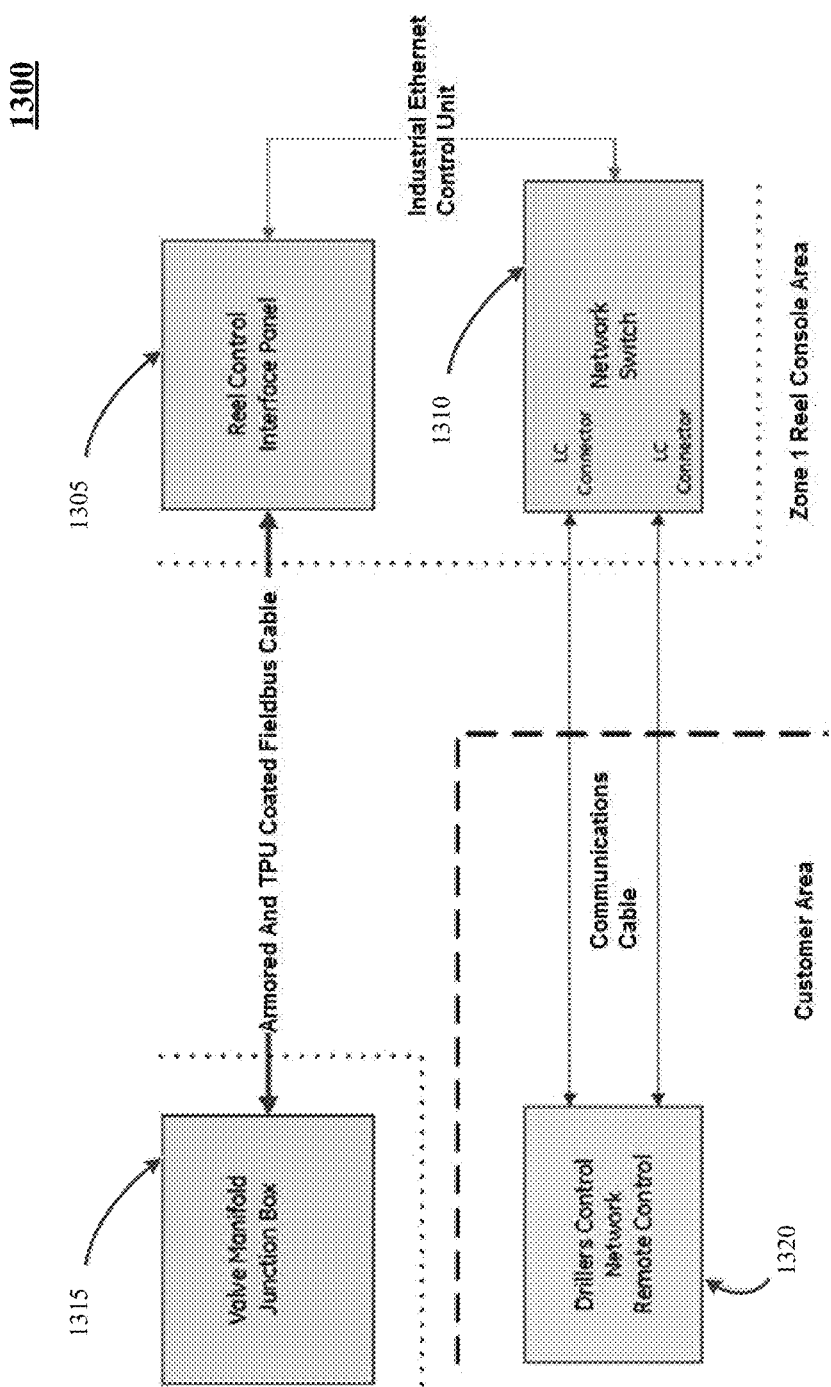
FIG. 13 illustrates functional communication characteristics for an automated reel control implementation, in accordance with an aspect of the present disclosure.

FIG. 13 illustrates functional communication characteristics 1300 for an automated reel control implementation, in accordance with an aspect of the present disclosure. The reel control interface panel 1305 communicates with the valve manifold junction box 1315 via armored and thermoplastic polyurethane (TPU) coated field bus (e.g., using process field bus) cables. The reel control interface panel 1305 communicates with the network switch 1310 within the reel control console via the industrial ethernet cabling disclosed with respect to FIG. 7. The network switch 1310 and the driller control network (DCN) 1320 communicate via dual fiber multi-mode cables of 62.5 or 125 µm, in one example. Connectors suitable for cable connections with industrial ethernet and/or fiber (e.g, standard fiber connectors, subscriber connectors, or miniature versions of these connectors) are used for the communication ports from the network switch 1310, in another example.

FIG. 14 is a flowchart demonstrating a method 1400 for implementing an automated reel control console in an aspect of the present disclosure. The method 1400 may be implemented via the automated reel control systems 100 or 200 disclosed with respect to FIGS. 1 and/or 2. The method 1400 includes a function block 1405 for receiving, at a second control network from a first control network, electrical control signals to the second control network. The electrical control signals are for controlling pneumatic solenoids of the second control network. The method further includes functional block 1410 for providing, from the second control network, pneumatic signals to first pneumatic valves. The pneumatic signals correspond to the electrical control signals and are based at least in part on the control of the pneumatic solenoids. The pneumatic signals correspond to the electrical control signals and are based at least in part on the control of the pneumatic solenoids. A controlling function via block 1415, is based at least in part on the pneumatic signals, to control, via the first pneumatic valves, axial movement of one or more reels comprising cables or feed lines, thereby spooling the cable or the feed lines. Block 1420 concludes the method 1400.

General

The various embodiments can be further implemented in a wide variety of operating environments, which in some cases can include one or more computing devices which can be used to operate any of a number of applications associated with the first and second control networks. The computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least the first and second control network and the network switches. These components support any of a variety of commercially-available protocols, such as TCP/IP, FTP, UPnP, NFS, and CIFS. The first and second control networks can be, for example, a local area network, a wide-area network, a virtual private network, the Internet, an intranet, an extranet, a public switched telephone network, an infrared network, a wireless network and any combination thereof.

In embodiments utilizing the internet, servers running a variety of server or mid-tier applications, including HTTP servers, FTP servers, CGI servers, data servers, Java servers and business application servers are applicable for at least the first control network. The server(s) may also be capable of executing programs or scripts in response requests from user devices, such as by executing one or more web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available servers that support structural query language and corresponding data storage processes, for instance.

Figure 2:
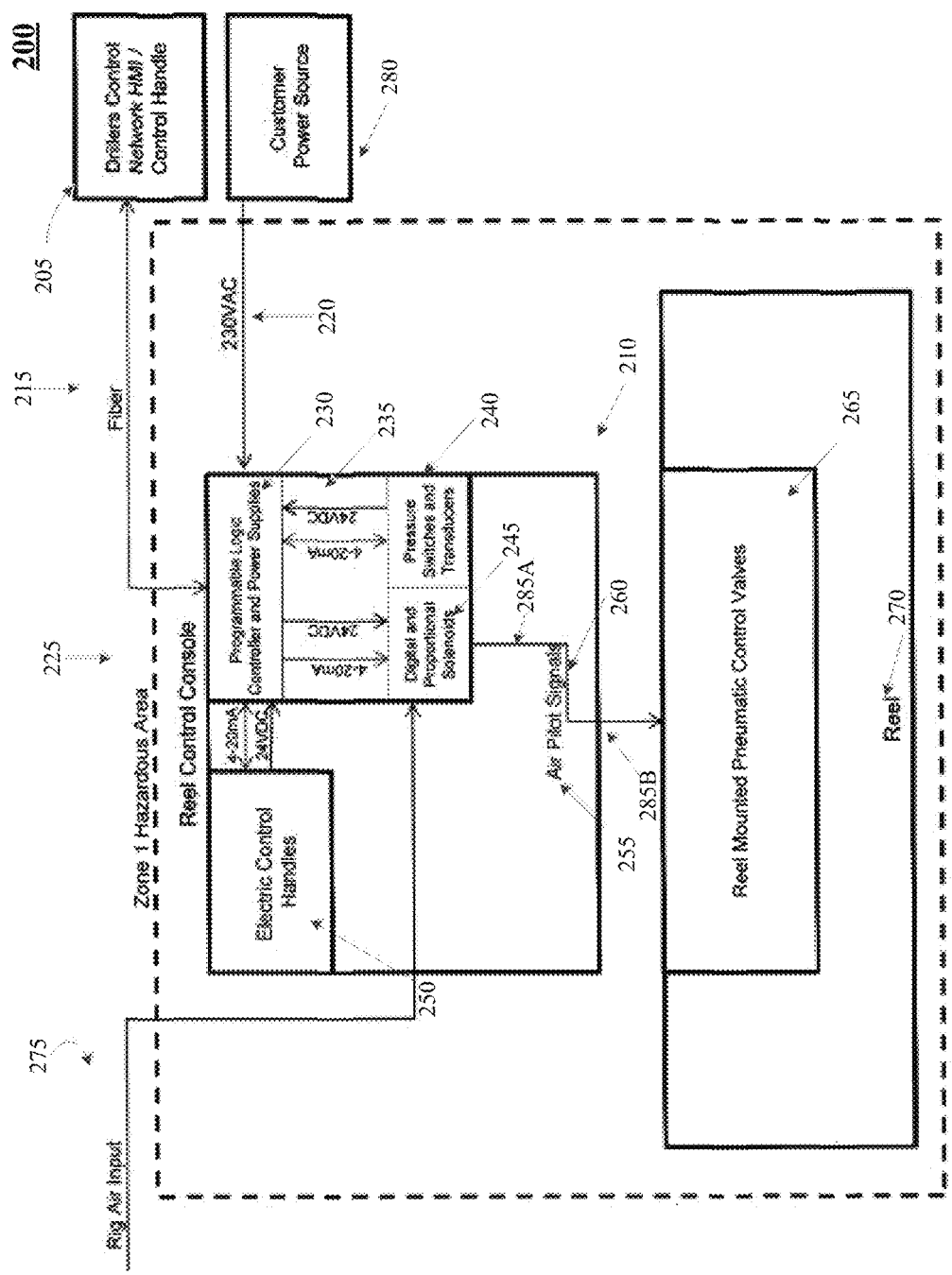
FIG. 2 is a line and block diagram for an alternate automated reel control, in accordance with another implementation of the present disclosure.

The systems 100 and 200 of FIGS. 1 and 2 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   a second control network for receiving electrical control signals from a first control network, the electrical control signals to control pneumatic solenoids of the second control network;
   the second control network for providing pneumatic signals to pneumatic valves, the pneumatic signals corresponding to the electrical control signals and based at least in part on the control of the pneumatic solenoids of the second control network; and
   the pneumatic valves associated with one or more reels comprising cables or feed lines, the pneumatic valves for controlling spooling movement of the one or more reels for spooling the cable or the feed lines, based at least in part on the pneumatic signals.

2. The system of claim 1, wherein the second control network is at least a network of one or more computing devices with a human user interface (HMI) for controlling the providing of the pneumatic signals to the pneumatic valves.

3. The system of claim 1, wherein the pneumatic solenoids are digital and/or proportional solenoids.

4. The system of claim 1, wherein the second control network comprises at least electric switches or handles coupled at least to a programmable logic controller (PLC) for providing PLC control signals for the pneumatic solenoids, the PLC control signals corresponding to the electrical control signals and for (a) the control of the pneumatic solenoids, and (b) the providing of the pneumatic signals by adjusting supply air received from a rig.

5. The system of claim 1, wherein the second control network comprises at least a programmable logic controller (PLC) for providing PLC control signals to the pneumatic solenoids, the PLC control signals corresponding to the electrical control signals and for the control of the pneumatic solenoids.

6. The system of claim 1, wherein the second control network comprises at least pressure switches and transducers, each for monitoring the pneumatic lines between one or more of: the second control network and the pneumatic valves.

7. The system of claim 1, wherein the second control network is configured to allow intervention to adapt the pneumatic signals differently from the electrical control signals based at least in part on monitored pressure in one or more of: (a) first pneumatic lines in the second control network, (b) second pneumatic lines to the pneumatic valves, (c) the pneumatic valves, and (d) the pneumatic solenoids.

8. The system of claim 1, wherein the second control network further provides: (a) monitoring of pneumatic lines that communicate the pneumatic signals between the second control network and the pneumatic valves, and (b) feedback to the first control network in accordance with the monitoring.

9. The system of claim 8, wherein the one or more reels for the spooling movement are responsive, based at least in part, to the feedback.

10. The system of claim 9, wherein the second control network comprises at least pressure switches and transducers, each for providing the feedback to the first control network, the feedback being positive feedback corresponding to monitored pressure inside pneumatic lines that communicate the pneumatic signals.

11. The system of claim 9, wherein the second control network communicates at least a digital feedback signal, as part of the feedback to the first control network, the digital feedback signal corresponding to monitored pressure in one or more of: (a) first pneumatic lines in the second control network, (b) second pneumatic lines to the pneumatic valves, (c) the first pneumatic values, and (d) the pneumatic solenoids.

12. A method comprising:
receiving, at a second control network from a first control network, electrical control signals to control pneumatic solenoids of the second control network;
providing, from the second control network, pneumatic signals to pneumatic valves, the pneumatic signals corresponding to the electrical control signals and based at least in part on the control of the pneumatic solenoids of the second control network; and
controlling, based at least in part on the pneumatic signals via the pneumatic valves, spooling movement of one or more reels comprising cables or feed lines, thereby spooling the cable or the feed lines.

13. The method of claim 12, wherein the second control network is at least a network of one or more computing devices with a human user interface (HMI) for controlling the providing of the pneumatic signals to the pneumatic valves.

14. The method of claim 12, wherein the pneumatic solenoids are digital and/or proportional solenoids.

15. The method of claim 12, further comprising: providing, from the second control network using at least electric switches or handles coupled to at least a programmable logic controller (PLC), PLC control signals for the pneumatic solenoids, the PLC control signals corresponding to the electrical control signals and for (a) the control of the pneumatic solenoids, and (b) the providing of the pneumatic signals by adjusting supply air received from a rig.

16. The method of claim 12, further comprising providing, from at least a programmable logic controller (PLC) of the second control network, PLC control signals to the pneumatic solenoids, the PLC control signals corresponding to the electrical control signals and for the control of the pneumatic solenoids.

17. The method of claim 12, further comprising: monitoring the pneumatic lines between one or more of: the second control network and the pneumatic valves, the monitoring using at least pressure switches and/or transducers of the second control network.

18. The method of claim 12, further comprising: intervening at the second control network to adapt the pneumatic signals differently from the electrical control signals based at least in part on monitored pressure in one or more of: (a) first pneumatic lines in the second control network, (b) second pneumatic lines to the pneumatic valves, (c) the pneumatic valves, and (d) the pneumatic solenoids.

19. The method of claim 12, further comprising: providing, via the second control network, (a) monitoring of pneumatic lines that communicate the pneumatic signals between the second control network and the pneumatic valves, and (b) feedback to the first control network in accordance with the monitoring.

20. The method of claim 19, further comprising the controlling of the spooling movement of the one or more reels based at least in part on the feedback.

21. The method of claim 19, further comprising: providing the feedback to the first control network using at least pressure switches and/or transducers in the second control network, the feedback being positive feedback corresponding to monitored pressure inside pneumatic lines that communicate the pneumatic signals.

22. The method of claim 19, further comprising communicating, from the second control network to the first control network, at least a digital feedback signal as part of the feedback, the digital feedback signal corresponding to monitored pressure in one or more of: (a) first pneumatic lines in the second control network, (b) second pneumatic lines to the pneumatic valves, (c) the first pneumatic values, and (d) the pneumatic solenoids.

* * * * *